United States Patent [19]

Hansen et al.

[11] Patent Number: 4,814,976

[45] Date of Patent: Mar. 21, 1989

[54] RISC COMPUTER WITH UNALIGNED REFERENCE HANDLING AND METHOD FOR THE SAME

[75] Inventors: Craig C. Hansen, Mountain View; Thomas J. Riordan, Atherton, both of Calif.

[73] Assignee: Mips Computer Systems, Inc., Sunnyvale, Calif.

[21] Appl. No.: 945,486

[22] Filed: Dec. 23, 1986

[51] Int. Cl.⁴ .............................................. G06F 9/30
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,976,979 | 8/1976 | Parkinson et al. | 309/200 |
| 4,090,237 | 5/1978 | Diamick | 364/200 |
| 4,240,144 | 12/1980 | Kindell et al. | 364/200 |
| 4,258,419 | 3/1981 | Blahut et al. | 364/200 |
| 4,271,480 | 6/1981 | Vinot | 364/900 |
| 4,276,596 | 6/1981 | Flynn et al. | 364/200 |
| 4,291,370 | 9/1981 | Charles | 364/200 |
| 4,339,795 | 7/1982 | Brereton et al. | 364/200 |
| 4,347,567 | 8/1982 | De Tar, Jr. et al. | 364/200 |
| 4,447,878 | 5/1984 | Kinnie et al. | 364/200 |
| 4,569,016 | 2/1986 | Hao et al. | 364/200 |
| 4,688,188 | 8/1987 | Washington | 364/900 |
| 4,733,346 | 3/1988 | Tanaka | 364/200 |
| 4,734,852 | 3/1988 | Johnson et al. | 364/200 |
| 4,736,317 | 4/1988 | Hu et al. | 364/200 |
| 4,739,471 | 4/1988 | Baum et al. | 364/200 |
| 4,747,046 | 5/1988 | Baum et al. | 364/200 |

FOREIGN PATENT DOCUMENTS 0171631  2/1986  European Pat. Off. .

*Primary Examiner*—Gareth D. Shaw
*Assistant Examiner*—Kevin A. Kriess
*Attorney, Agent, or Firm*—Kenyon & Kenyon

[57] ABSTRACT

In a RISC device a set of four instructions are provided which allow either the loading or the storage of an unaligned reference. The instructions are overlapped to reduce the overall execution time of the device. A circuit is also provided for executing the instruction set.

14 Claims, 3 Drawing Sheets

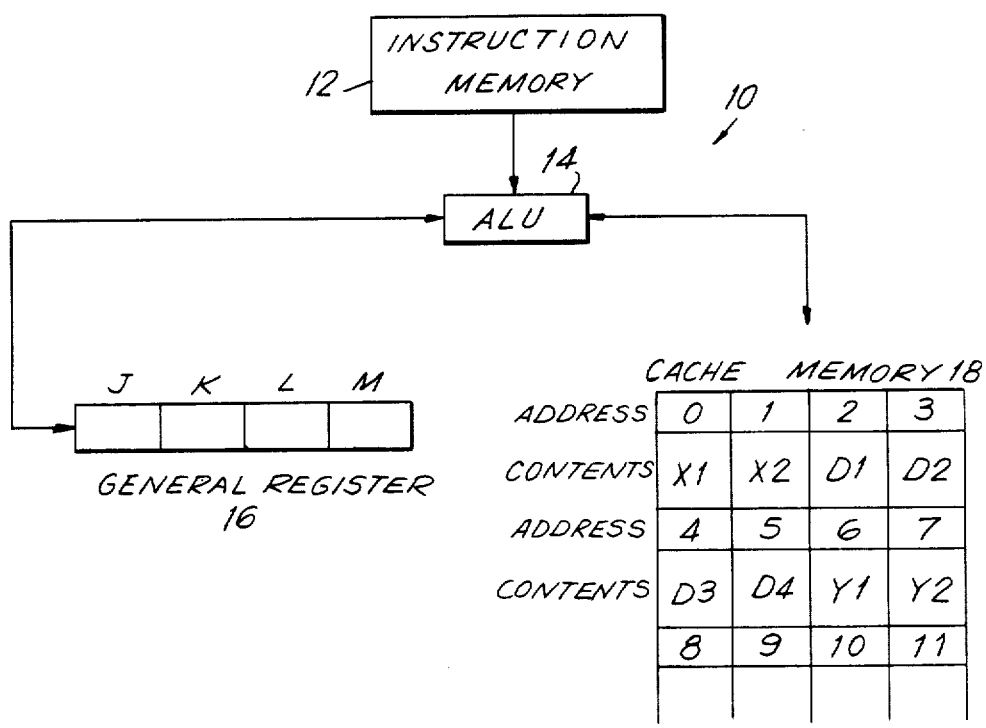
FIG.1
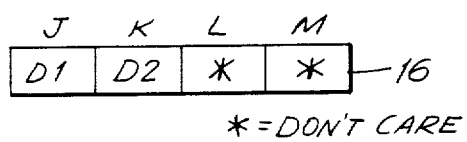
FIG.2
\* = DON'T CARE
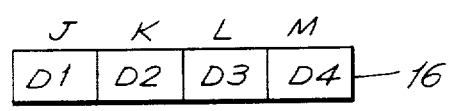
FIG.3
FIG.4

| CACHE MEMORY 18 | | | | |
|---|---|---|---|---|
| ADDRESS | 0 | 1 | 2 | 3 |
| CONTENTS | * | * | P1 | P2 |
| ADDRESS | 4 | 5 | 6 | 7 |
| CONTENTS | P3 | P4 | | |

FIG. 6

CACHE MEMORY 18

| 0 | 1 | 2 | 3 |
|---|---|---|---|
| * | * | E1 | E2 |
| 4 | 5 | 6 | 7 |
| E3 | E4 | * | * |

RISC COMPUTER WITH UNALIGNED REFERENCE HANDLING AND METHOD FOR THE SAME

BACKGROUND OF THE INVENTION

This invention pertains to a computer with a instruction set capable of handling unaligned references, and more particularly, the reading and writing of data having fractional word length, as well as a method for handling the same.

A new development in computer architecture has been the introduction of so called RISC (Reduced Instruction Set Computer) devices, in which each instruction is ideally performed in a single operational cycle. Such devices are advantageous over computers having standard architecture and instruction sets in that they are capable of much higher data processing speeds due to their ability to perform frequent operations in shorter periods of times. Frequently, computers and similar data processors must be able to handle data having fractional word length. For example, although many computers are designed to handle words two or four bytes in length (i.e., words of 16 or 32 bits each), certain peripheral devices and applications generate or accept data of only one or two bytes. This is often the case with data processing programs and products. One result of this type of data is that it produces an unaligned reference. Namely, for a machine capable of handling four-byte words (32 bit devices), if incoming data is located sequentially as two bytes of data followed by four bytes of data, the four bytes of data cannot be retrieved or stored in a single cycle because it would overlap a word boundary within the memory. This effect is even more problematical if a word overlaps a page boundary within the memory because, if a virtual memory system is used, only a portion of the word may actually reside in addressable memory. Therefore, prior art RISC devices either do not accept data in this form, in which case special procedures must be followed to ensure that all data is aligned in word boundaries, or very involved programming is required which uses up at least two consecutive instruction cycles. One way to ensure for example that all data is aligned in word boundaries would be to add extra bits to data of shorter length, usually known as bit stuffing. Whether bit stuffing is used or the programming is altered, it is obvious that unaligned references seriously degrade the performance of prior art RISC devices.

Also, it should be noted that data is organized in modern computers in either of two formats or in some combination of those formats. The formats are known as "big endian," in which the high order bit, byte, or other unit of information is located in the lower numbered unit address, and "little endian," in which the high order unit of information is located in the higher numbered unit address. Thus, in a true big endian computer architecture, bits of data are thought of as being lined up from left to right, the lowest numbered and most significant bit being on the left. When this string of bits is divided into, for example, 8-bit bytes, 16-bit halfwords, and/or 32-bit words, the lowest numbered and most significant byte, halfword, or word continues to be located on the left. In a true little endian architecture, the scheme is exactly the opposite. Bits, bytes, halfwords, and words are numbered right to left, the least significant bit, byte, halfword, or word being located on the right.

SUMMARY OF THE INVENTION

In view of the above, it is an objective of the present invention to provide a means and method of handling unaligned references within a RISC device.

Another objective is to provide a RISC device which is capable of loading or storing an unaligned reference in a reduced number of instruction cycles, thereby maintaining a high processing speed for the device.

A further another objective is to provide a method and means of handling unaligned references which can be easily implemented, without any major changes in the hardware or the operating system.

Other objectives and advantages of the system shall become apparent from the following description of the invention.

Briefly, a RISC device for handling unaligned references includes an instruction set which has four instructions: two instructions (Load Word Left and Load Word Right) for loading an n byte unaligned reference from a memory into an n byte general register; and two instructions (Store Word Left and Store Word Right) for storing an unaligned reference from the general register into the memory. The two instructions are used sequentially in a manner which allows the corresponding instruction sequences to overlap. Therefore, the total time required to store or load an unaligned reference is much shorter than the time required to execute two independent instructions.

The device includes several latches through which data is propagated during the above-mentioned instructions and a multiplexer register used to assemble the different sections of an unaligned reference.

BRIEF DESCRIPTION OF THE DRAWINGS

The present invention is illustrated by way of example and not limitation in the figures of the accompanying drawings, in which like references indicate similar elements, and in which:

FIG. 1 shows in diagramatic form elements of an embodiment of the present invention;

FIG. 2 shows the general register after a Load Word Left instruction;

FIG. 3 shows the general register after a Load Word Right instruction;

FIG. 4 shows successive operational intervals for Load Word Left and Load Word Right instructions;

FIG. 5 shows the general register and the cache memory before the STORE instructions;

FIG. 6 shows the cache memory after the unaligned reference has been stored.

DETAILED DESCRIPTION OF THE INVENTION

Figure 7:
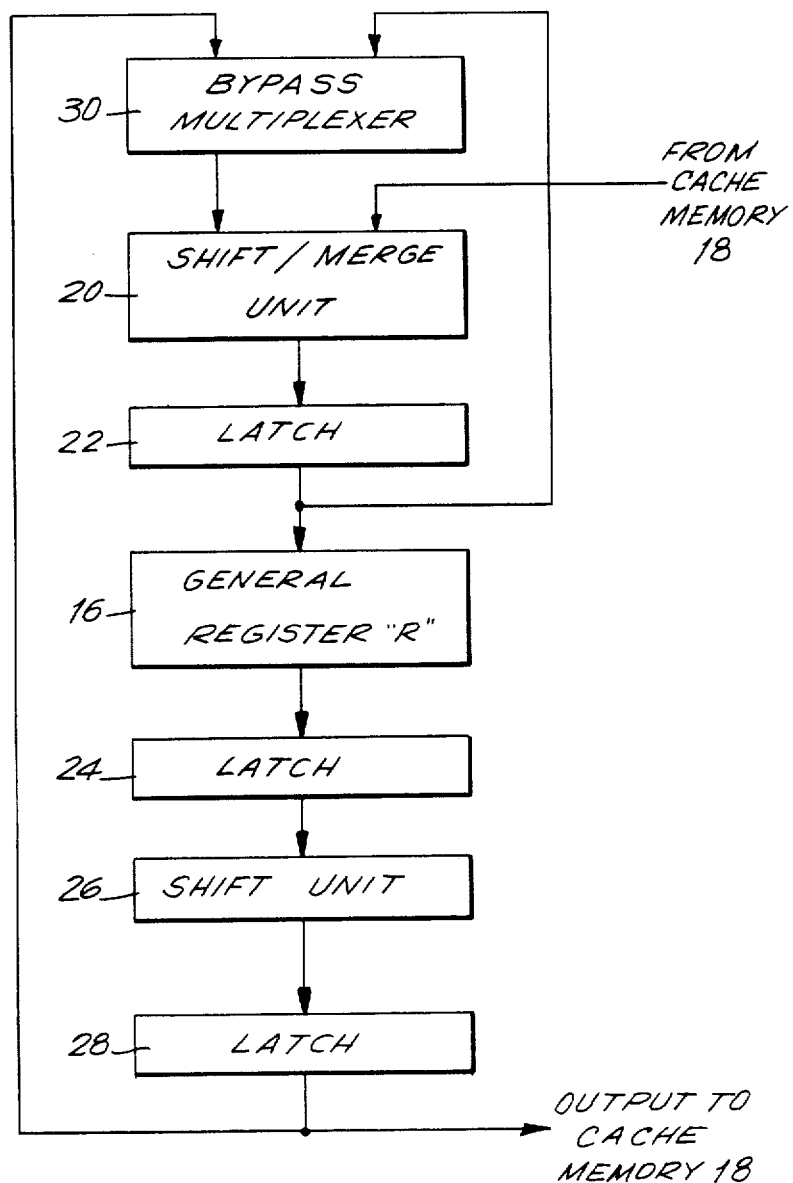
FIG. 7 shows, in block diagram form, a circuit arrangement used for executing the instruction set.

Embodiments of the invention shall be described in connection with a 32-bit device, i.e., a RISC device in which four-byte words with eight bit bytes are handled. However, it should be understood that the means and method for handling unaligned references described herein is equally applicable to devices that handle longer or shorter words or bytes.

Further, although this description is with respect to big endian addressing, it is equally applicable to little endian addressing.

With reference to the drawings, FIG. 1 shows a RISC device 10 comprising an instruction memory 12 (which is comprised of random access memory ("RAM"), read-only memory ("ROM"), or an instruction cache memory) which holds the instructions which make up the operation system of the device, an arithmetic logic unit ("ALU") 14, a general register 16, and a cache memory 18. The general register 16 is four bytes wide, and cells are identified in FIG. 1 as cells J, K, L, and M, respectively. Similarly, cache memory 18 is organized to hold data in rows, with each row of four bytes being addressable simultaneously. Each row therefore can be identified by the first cell of the row. Thus, the cache memory is made up of rows 0, 4, 8, etc. For example, cache memory may contain a two byte data group X1, X2; a four byte data group D1, D2, D3 and D4; and another two byte group Y1 and Y2. As can be seen from FIG. 1, because the first group (X1, X2) is only two bytes long, the full or one word long data group D1-D4 overlaps the boundary between rows 0 and 4 of the cache memory. As a result, if a normal load instruction is used such as LOAD WORD 0 to load the contents of memory row 0 into general register 16, only the first two bytes D1 and D2 are obtained. Special provisions must be made to save these bytes and then LOAD WORD 4 to obtain the remaining bytes D3 and D4. This is accomplished in the present invention by using two special instructions named Load Word Left and Load Word Right hereinafter called LWL and LWR, respectively. Each of these instructions is followed by two arguments. The two instructions and their arguments are defined more specifically below:

TABLE 1

| LOAD INSTRUCTIONS | | |
|---|---|---|
| Instruction | Arguments | Function |
| Load Word Left | R, Byte Address | loads the left portion of the register R with data beginning at the specified memory byte address and proceeding rightward to the memory word boundary. |
| Load Word Right | R, Byte Address | loads the right portion of the register R with data beginning at the memory word boundary and proceeding rightward to the specified memory byte address. |

As shown below, at the end of the fourth interval, the data bytes removed from the cache memory are saved in the general register in such a manner that they are not erased by the next load operation (LWR). This allows the bytes obtained by LWL and LWR instructions to be combined properly.

Thus, in order to load word D1-D4 from the cache memory into the general register 16, first the following instruction is used: LWL R,2. This instruction loads bytes D1 and D2 into cells J and K, respectively, as shown in FIG. 2. Thereafter, the instruction LWR R,5 is used which loads bytes D3 and D4 into cells L and M, respectively, as shown in FIG. 3, thereby completing the loading of the word. In general, for a big endian device and a memory having rows four bytes wide, if the Byte Address for the LWL instruction is X, the Byte Address for the corresponding LWR instruction is X+3.

Advantageously, the two instructions described above may be executed in an overlapping matter. Thus, the following five step sequence may be required to perform one of the load operations described above:

1. Fetch instruction from the ROM (step "I");
2. Read Register File (step "R");
3. Compute address (step "A");
4. Access Cache Memory (step "M"); and
5. Write into Register File (step "W").

These steps are taken by the ALU 14 and may be overlapped as shown in FIG. 4 as follows. The first instruction—LWL R,2—may start during interval 1 and end in interval 5 with each of the intervals being used for one of the steps I, R, A, M, and W as defined above. However, the second instruction—LWR R,5—can start during interval number 2 as shown in FIG. 4. Because the device does not have to wait for the completion of the second instruction before the completion of the first, the overall speed of operation of the device is increased. Thus, the total time required to load the unaligned reference word requires only six intervals, only one interval more than the number of intervals required for a single instruction.

The pair of LOAD instructions LWL and LWR can be executed in either order, however; either LWL or LWR can come first. Furthermore, the LOAD instructions still work when the are not adjacent.

The above-described procedure is readily extendable to the storage of an unaligned reference. In FIG. 5, general register 16 contains a four byte word E1, E2, E3 and E4 which is to be stored in the same order in positions P1-P4. In order to perform this operation, the device uses the instructions Store Word Left ("SWL") and Store Word Right ("SWR"), each having two arguments. The two STORE instructions are defined in table 2 below:

TABLE 2

| STORE INSTRUCTIONS | | |
|---|---|---|
| Instruction | Arguments | Definition |
| Store Word Left | R, Byte Address | stores data from the left portion of the register R into the specified memory byte address and proceeding rightward to the memory word boundary. |
| Store Word Right | R, Byte Address | stores data from the right portion of the register R into the memory byte just after the memory word boundary, and proceeding specified memory byte address. |

In general, for a big endian device and a memory having rows four bytes wide, if the Byte Address for the SWL instruction is X, then the Byte Address for the corresponding SWR instruction is X+3.

At the end of the first STORE instruction, bytes E1 and E2 are stored at addresses 2 and 3, respectively, and at the end of the second store instruction, bytes E3 and E4 are stored at addresses 4 and 5, respectively, as shown in FIG. 6.

Like the LOAD instructions, the STORE instructions can be executed in either order; either SWL or SWR can come first. Furthermore, the STORE instructions still work when they are not adjacent.

A circuit for executing the four instructions is shown in block diagram form in FIG. 7. This circuit may be implemented directly, or by using software. The circuit comprises a shift/merge unit 20 which receives an input from cache memory 18 and generates an output which is fed (in parallel) to a latch 22. The latch 22 in turn feeds a general register 16 to be designated by the argument R in the appropriate instruction. The contents of general register 16 are propagated during each operational interval though a latch 24, shift unit 26, and latch 28. Latch 28 can feed the cache memory 18. There is also a first feedback path from the output of latch 28 to a first input of bypass multiplexer unit 30. The multiplexer unit 30 has a second input connected to the output of latch 22 which therefore forms a second feedback path. The output of multiplexer unit 30 is also fed to shift/merge unit 20. During the STORE instructions, the multiplexer 30, shift/merge unit 20, and latch 22 are not in operation. During the LOAD instructions, shift unit 26 merely feeds through the data from latch 24 to latch 28 without any appreciable time delay. One of the purposes of latch 24 and latch 28 is to match the delay of the circuit path containing those latches with the number of steps making up an instruction. If the number of steps making up an instruction were increased or decreased, the number of latches in the circuit would change accordingly. The circuit of FIG. 7 operates as follows.

A LWL instruction is received during interval 1 (see FIG. 4). Then in interval 4, the four bytes from the row containing the address defined in the argument Byte Address are shifted to the left by the shift/merge unit 20 and merged with what had been the contents of the general register 16 two intervals earlier. (The contents of general register 16 having been fed through latch 24, shift unit 26, latch 28, and bypass multiplexer 30). The results of this operation are stored in latch 22 at the end of interval 4. Thus, if row 0 is read from the cache memory 18, latch 22 will contain the bytes D1, D2, Y, and Z, wherein Y and Z were the earlier contents of general register 16 memory cells L and M. Earlier, during interval 2, instruction LWR R,5 is also received. In interval 5, the contents of latch 22 are fed to general register 16. At the same time, the LWR instruction causes the contents of the row 4 to be read into shift/merge unit 20. This time these bytes are shifted right until the end of the word boundary. Because the two instructions refer to the same general register and are adjacent, multiplexer 30 is now set to feed the contents of latch 22 to shift/merge unit 20. Thus, during interval 5, the bytes D1, D2, D3, and D4 are assembled within the shift/merge unit 20 and fed to latch 22. During interval 6 these bytes are fed to register 16.

The STORE instructions are executed as follows. The unaligned reference word is fed from the general register 16 (identified as register R) to latch 24. During the first STORE instruction—SWL R,2—the word fed from latch 24 is shifted in shift unit 26 to the right by two bytes so that bytes E1 and E2 are in the right hand position. The contents of the shift unit 26 are then fed to latch 28, which then sends the same to the address 2 of the cache memory. More particularly, for SWL R,2, E1 and E2 are stored at locations P1 and P2, respectively, without disturbing the contents at memory address 0 and 1 (FIGS. 5 and 6).

The unaligned reference word is again fed from general register 16 to latch 24. In response to the SWR R,5, the contents of latch 24 are shifted to the left so that bytes E3 and E4 are on the left side of the shift unit 26, and are then fed to row 4 by latch 28. More particularly, during SWR, bytes E3 and E4 are stored in locations P3 and P4 without disturbing the contents at addresses 6 and 7.

In devices in which error correction coding ("ECC") is used, a read modify write cycle is performed so that a new ECC Code is calculated after each STORE instruction.

As with the LOAD instructions, the STORE instructions SWR and SWL are overlapped to reduce the overall time required to complete the instructions. Thus, the two instructions required to store the unaligned reference require only six intervals, only one interval more than the number of intervals required for a single instruction. It should be appreciated that since each row of the cache memory is handled separately on an individual basis, the fact that a reference may overlap a page boundary within the memory has no effect on the device.

It should also be noted that the pair of STORE instructions can be executed in either order; either SWL or SWR can come first. Correspondingly, the pair of LOAD instructions can also be executed in either order; either LWL or LWR can come first. Further, the LOAD instructions still work when they are not adjacent, and the same is true with respect to the STORE instructions.

The above set of instructions are suitable for a big endian device, i.e., a device in which the leftmost bit is the most significant bit. However, the same arrangement and procedure may used for a little endian device, i.e., a device wherein the leftmost bit of a byte is the least significant bit. The only change that needs to be made is to increment the address value of the arguments to the LWL and SWL instructions by 3 rather than to increment the arguments to the LWR and SWR instructions (as is done in the big endian device). Alternatively, a generic set of instructions could be used by changing "left" and "right" in the above instructions to "lower address" and "higher address," wherein the "lower address" instructions would operate as "left" on a little endian machine and "right" on a big endian machine, and the "higher address" instructions would operate as "right" on a little endian machine and "left" on a big endian machine. This set of instructions could also be used for devices which can handle both big endian and little endian data (i.e., dual byte order devices).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a reduced instruction set computer with a memory holding m-bit words separated by word boundaries, a device for retrieving an unaligned reference from said memory comprising:
   a. a general register;
   b. means for retrieving a first word containing a first portion of said unaligned reference in response to a nth instruction and a second word containing a second portion of said unaligned reference from said memory in response to an (n+k)th instruction;
   c. shifting means for shifting said first portion to a first position and second portion to a second position; and d. combining means for combining said first and second portions in said general register, wherein k and n are positive integers.

2. In reduced instruction set computer, a device for storing an unaligned reference into a memory with m-bit locations comprising:

shifting means for shifting said unaligned reference in a first direction in response to an nth instruction and in a second direction in response to (n+k)th instruction, said means generating sequentially a first and second portion each having less than m-bits; and means for storing said first and second portions sequentially into said memory, wherein k and n are positive integers.

3. In a reduced instruction set computer with a memory for holding m-bit words, a device for loading a first unaligned reference having first and second portions of less than m-bits, said first portion being stored into a first section of said memory and said second portion being stored into a second section of said memory, and for storing a second aligned reference into said first and said second sections, comprising:

a shift/merge unit having first and second inputs and being provided to shift first data bytes received from said first input, said first input being coupled to said memory unit to receive said first and second portions sequentially, and merge said first data bytes with second data bytes from said second input to form an m-bit word;

a first latch means for storing said first and second data bytes, said latch having an output coupled to said second input;

an m-bit general register coupled to said first latch means and provided for holding selectively one of said first or second unaligned references;

a second latch means coupled to said register for storing said second unaligned reference;

shifting means for shifting said second unaligned references; and output means for storing said second unaligned reference after shifting by said shifting means into said memory.

4. The device of claim 3 wherein said shift/merge unit shifts bytes received from said memory in a first direction in response to a first load instruction, and in a second direction in response to a second load instruction.

5. The device of claim 3 wherein said shifting means shifts bytes received from said second latch means in a first direction in response to a first store instruction, and in a second direction in response to a second store instruction.

6. The device of claim 3 further comprising a bypass multiplexer for selectively coupling to said second input one of the outputs of said first and second latching means.

7. The device of claim 4 wherein said first and second load instructions are at least partially overlapped.

8. The device of claim 5 wherein said first and second store instructions are at least partially overlapped.

9. A method of loading an m-bit unaligned reference from a memory, said memory holding m-bit words separated by word boundaries, said m-bit unaligned reference being divided into a first portion and a second portion by a word boundary, comprising the steps of:

a. retrieving a first word from said memory containing said first portion during an (nth) instruction;
b. shifting said first portion to a first position;
c. retrieving a second word containing said second portion during an (n+k)th instruction;
d. shifting said second portion to a second position; and
e. merging said first and second portions;

wherein said k and n are positive integers and wherein said first and second portions have less than m bits.

10. The method of claim 9 wherein said first and second positions are defined by said nth and (n+k)th instruction respectively.

11. The method of claim 9 wherein said nth and (n+k)th instructions are overlapped.

12. A method of storing an unaligned reference into a computer memory, said computer memory holding m-bit locations separated by word boundaries, comprising the steps of:

a. shifting a first portion of said reference to a first portion;
b. storing said first portion in one location within an nth instruction;
c. shifting a second portion of second portion of said reference to a second position; and
d. storing said second portion to a second location within an (n+k)th instruction, wherein n and k are positive integers and wherein said first and second portions have less than m bits.

13. The method of claim 12 wherein said first and second position are defined by said nth and (n+k)th instruction respectively.

14. The method of claim 12 wherein said nth and (n+k)th instructions are overlapped.

* * * * *

(12) REEXAMINATION CERTIFICATE (4585th)
United States Patent
Hansen et al.

(10) Number: US 4,814,976 C1
(45) Certificate Issued: Jun. 4, 2002

(54) RISC COMPUTER WITH UNALIGNED REFERENCE HANDLING AND METHOD FOR THE SAME

(75) Inventors: Craig C. Hansen, Mountain View; Thomas J. Riordan, Atherton, both of CA (US)

(73) Assignee: MIPS Technologies, Inc., Mt. View, CA (US)

Reexamination Request:
No. 90/005,880, Dec. 8, 2000
No. 90/006,049, Jul. 2, 2001
No. 90/006,096, Aug. 27, 2001

Reexamination Certificate for:
Patent No.: 4,814,976
Issued: Mar. 21, 1989
Appl. No.: 06/945,486
Filed: Dec. 23, 1986

(51) Int. Cl.$^7$ .............................. G06F 12/04; G06F 9/30
(52) U.S. Cl. ....................................................... 711/201
(58) Field of Search ................................. 711/170, 171, 711/172, 173, 201

(56) References Cited

U.S. PATENT DOCUMENTS 3,916,388 A   10/1975   Shimp et al. .................. 372/89

OTHER PUBLICATIONS

Patterson, David A., "Microprogramming," Scientific American, v248, p50(8) (Mar., 1983).

G.W. Struble, "Assembler Language Programming: the IBM System/360 and 370," p. 63–68 and 210–220 (2nd 1975).

IBM System/370 Principles of Operation, p. 131, p. 141 (5$^{th}$ 1976).

David A. Patterson, Microprogramming, Scientific America Mar. 1983, 50–57, vol. 248, No. 3.

Transcript of Proceedings ("Markman Hearing"), MIPS Technologies, Inc. v. Lexra, Inc., Apr. 25, 2001, pp. 1–4.

Lexra, Inc.'s Responsive Brief on Claim Construction, Oct. 12, 2000, p. 13.

Alan Freedman, The Computer Desktop Encyclopedia, ±996, pp. 436, 508.

*Primary Examiner*—Kevin L. Ellis

(57) ABSTRACT

In a RISC device a set of four instructions are provided which allow either the loading or the storage of an unaligned reference. The instructions are overlapped to reduce the overall execution time of the device. A circuit is also provided for executing the instruction set.

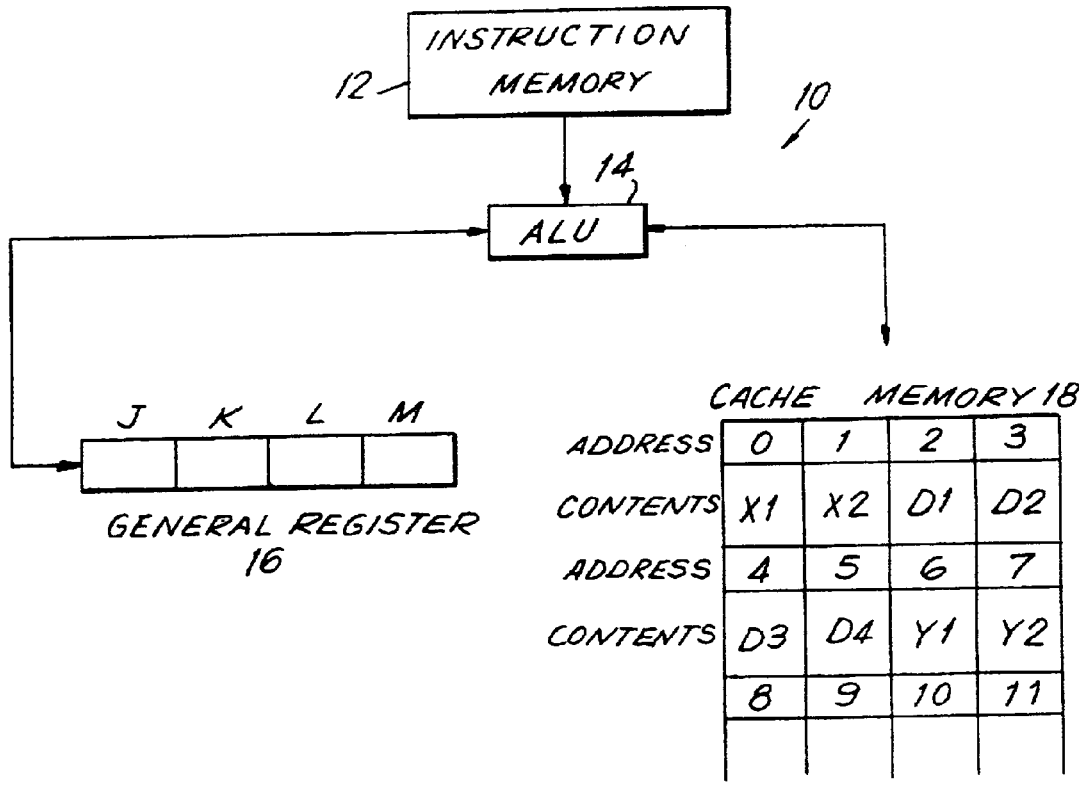

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *